(12) United States Patent
Alanko

(10) Patent No.: US 6,199,649 B1
(45) Date of Patent: Mar. 13, 2001

(54) SNOWMOBILE STEERING AND SKI SUSPENSION

(75) Inventor: John S. Alanko, Aurora (CA)

(73) Assignee: Arctek Inc. (CA)

( * ) Notice: Subject to any disclaimer, the term of this patent is extended or adjusted under 35 U.S.C. 154(b) by 0 days.

(21) Appl. No.: 09/084,184

(22) Filed: May 26, 1998

(51) Int. Cl.$^7$ .............................. B62B 13/08; B62B 17/04
(52) U.S. Cl. ............................ 180/190; 180/186; 280/16; 280/28
(58) Field of Search ..................................... 180/182, 190, 180/186; 280/16, 17, 22, 22.1, 21.1, 15, 608, 609, 606, 14.3, 28

(56) References Cited

U.S. PATENT DOCUMENTS

| | | | |
|---|---|---|---|
| 3,645,347 | * | 2/1972 | Brant .................................... 280/608 |
| 4,036,506 | * | 7/1977 | Scheib ................................. 280/22.1 |
| 4,405,140 | * | 9/1983 | Stevens ................................. 280/16 |
| 4,671,521 | * | 6/1987 | Talbot et al. ......................... 180/190 |
| 4,796,902 | * | 1/1989 | Capra ..................................... 280/16 |
| 5,145,201 | * | 9/1992 | Metheny ............................. 280/609 |
| 5,474,146 | * | 12/1995 | Yoshioka et al. .................... 280/608 |
| 5,503,242 | * | 4/1996 | Jeffers ................................... 280/16 |

* cited by examiner

*Primary Examiner*—Anne Marie Boehler

(57) ABSTRACT

In a snowmobile ski suspension having two parallel front mounted steerable skis, each ski is steerable by rotation of the trailing suspension arms about a frame mounted bearing forward of the center of the ski. Steering input from the handlebar rotates the suspension and the ski. The ski moves laterally towards the outside of a turn during rotation to provide increased cornering stability. The ski has a keel mounted forward of its center for ease of turning. The dual support steering column provides a forward offset for the handlebar which leans the driver toward the inside of a corner for better balance and provides crash protection.

4 Claims, 10 Drawing Sheets

SNOWMOBILE STEERING AND SKI SUSPENSION

BACKGROUND OF THE INVENTION

1. Field of the Invention

The present invention relates to a steering and suspension system for typical motorized snowmobiles in use for recreational purposes, and particularly to improving the maneuverability and safety of such snowmobiles.

2. Description of the Prior Art

The typical snowmobile used for recreational purposes today is not much different from the original recreational snowmobile developed by Armand Bombardier. The recreational snowmobile is propelled by a rear mounted cleated endless rubber track powered by a gasoline engine and steered by two forward mounted parallel skis. The driver turns the snowmobile by using a handlebar connected through a linkage to turn the skis in a parallel fashion with respect to the drive track. The uncertain footing provided by snow and ice make it difficult to control the typical snowmobile especially when travelling at speed. The ski suspension typical of early snowmobiles consisted of a downwardly arched leaf spring mounted on a typical ski such that the steering connected to and turned the leaf spring and consequently the ski, the leaf spring arching to provide cushioning to the ride and keeping the ski in contact with the snow. This type of suspension had very limited vertical travel and did not support the ski with much precision. Newer telescoping type ski suspension as described by West in U.S. Pat. No. 4,143,729 and Blanchard in U.S. Pat. No. 4,826,185 increased the usable vertical travel and provided integral damping means and better control of the ski. The most common type of ski suspension now in use is described by Talbot in U.S. Pat. No. 4,671,521. The trailing arm support with parallel transverse arms provides for excellent ski stability when turning and excellent vertical travel with a strong, relatively simple design. The transverse suspension arms are centrally mounted on the snowmobile and move the skis vertically in an arc instead of a straight line. This lateral ski displacement during compression of the ski suspension in conjunction with a relatively stable steering rod linkage causes the skis to toe out on compression of the suspension resulting in erratic steering or "bump steer". Current steering and suspension systems mount the ski axially about the vertical central turning point of the ski and support the snowmobile front end on the same point. The driver must shift his weight toward the inside of a turn to prevent the snowmobile from rolling over. This shift is necessary to bring the center of gravity of the driver —snowmobile combination closer to the inside turning arc to balance centrifugal cornering force with gravity to prevent rollover. Unpredictable footing on snow can often make this feat impossible and accidents occur, particularly for drivers not skilled in this type of maneuver. Prior snowmobile suspensions have been functional only in supporting the weight of the snowmobile by applying pressure to the skis and providing a laterally stationary bearing for ski rotation. Steering on prior snowmobiles has been by rotation of the ski about its center of support at the ski leg, providing the same level of lateral support on both sides of the snowmobile during cornering.

The skis on current snowmobiles generally have a keel on the bottom running surface which is approximately equal in length both forward and aft of the center of the ski in order to maintain ease of steering.

Snowmobiles by nature of their generally light weight and recreational use have very little in the way of safety features. Frontal collisions by snowmobiles almost always result in serious injury to the driver since there is no energy absorbing barrier between the driver and the object being struck.

SUMMARY OF THE INVENTION

It is the aim of the present invention to provide a snowmobile steering and suspension mechanism which laterally shifts the support of the skis toward the outside of the turning arc during cornering, thereby providing additional outboard support for the snowmobile and reducing the tendency of the snowmobile to roll over. It is a further aim of the present invention to provide a snowmobile steering and suspension mechanism which applies increased support pressure to the outboard ski of the snowmobile during cornering to further stabilize the snowmobile and prevent roll over. It is a further aim of the present invention to provide a snowmobile steering and suspension mechanism which shifts the center of gravity of the snowmobile toward the inside of the turning arc of the snowmobile to improve cornering stability. It is a further aim of this invention to provide a steering mechanism for a snowmobile that positions the driver's weight toward the inside of a turning arc of a snowmobile. It is a farther aim of the present invention to provide a steering mechanism that absorbs and redirects the impact energy of a snowmobile driver colliding with the steering handlebar during a frontal impact of the snowmobile.

The embodiment of this invention in a snowmobile is characterized by the dual function of the suspension arms and suspension spring as rotatable steering members. The suspension arms are linked to the snowmobile frame by a rotatable suspension mounting at the front frame of the snowmobile on generally vertical support bearings. Turning of the handlebar on the steering column moves the left and right steering control rods longitudinally which correspondingly rotate the rotatable suspension mountings. The rotatable suspension mountings rotate the suspension arms in an arc about the generally vertical support bearings. The ski leg bearing supports, ski legs and skis, supported by the suspension arms connected in this manner rotate about the generally vertical support bearings, becoming angular to the direction of travel of the snowmobile and causing it to turn. The weight supporting bottom area of the ski does not rotate about its central point, at approximately its ski leg location, but rotates about a center forward of the center of the supporting area of the ski, resulting in lateral displacement of the ski supporting area toward the outside of the turning arc of the snowmobile. The angle of the suspension arms and connected skis with respect to the line of forward motion of the snowmobile determine the turning radius of the snowmobile. The turning radius of the snowmobile can be decreased further rotating the ski by its ski leg within its ski leg support bearing concurrently with the rotation of the rotatable suspension mounting. A control arm, mounted on its inboard end to the rotatable ski leg within its ski leg support bearing, has its outboard end held equidistant to a frame of the snowmobile by a swivel mounted control rod to maintain the position of the control arm outboard end laterally equidistant from the snowmobile during steering movement of the suspension arms and ski leg radially around the frame mounted generally vertical support bearing. The lateral movement of the ski leg with respect to the frame of the snowmobile causes the control arm to rotate the ski leg and ski about the ski leg ski leg support bearing resulting in greater angularity of the ski with respect to the snowmobiles line of forward motion.

In the preferred embodiment of the invention the frame mounted generally vertical support bearing supporting the rotatable suspension mounting is given a positive camber angle to tilt the plane of rotation of the suspension arms downwardly outboard of the snowmobile thus increasing downward support pressure on the outboard side of a turning arc and reducing downward support pressure on the inboard side of the turning arc and further stabilizing the snowmobile during turning.

In the preferred embodiment, the steering column is downward angled to the front of the snowmobile and provides a straight line connection from the front of the snowmobile to the driver. The energy of a frontal impact to the snowmobile is absorbed in part by a deformable energy absorbing section of the steering column. A similar parallel impact absorbing column is forward mounted to the steering column creating a parallelogram linkage to provide planar stability to the steering handlebar and impact support. During a collision, the impact of the driver onto the handlebar and impact support causes the column to break away from its midsection frame mounting and pivot upwards from the steering column frame mounting in a parallelogram fashion, redirecting the forward motion of the driver upward and away from the direction of travel and the object of the collision. Further, the energy of the driver impact onto the handlebar and impact support is substantially absorbed by the energy absorbing sections of the steering column and impact column, reducing driver injury.

In another embodiment of the invention, a transverse mounted generally horizontal torsion member can be employed to generate downward support pressure to the ski to support the snowmobile. The torsion member rotates the generally vertical support bearing directly and transfers the rotary force to the rotatable suspension mounting and integral suspension arm which urges the pivotally attached ski downward to support the snowmobile. In this embodiment of the invention, the suspension spring is generally perpendicular to the suspension arm and does not rotate with the suspension arm. The support center of the ski thus suspended moves closer to the torsion spring axis as the suspension arm angle to the torsion spring axis diminishes while turning the suspension arm providing increased support pressure and reduced vertical travel of the ski in the turn resulting in improved cornering stability.

In the preferred embodiment of the invention the ski shall have its keel section diminished from the center of the ski rearwards. The steering keel on the bottom running surface of the ski is centered beneath the frame mounted generally vertical support bearing which is the center of rotation of the suspension arm and ski, greatly reducing steering effort yet not affecting the support area of the ski bottom surface.

DESCRIPTION OF THE PREFERRED EMBODIMENTS

Figure 1:
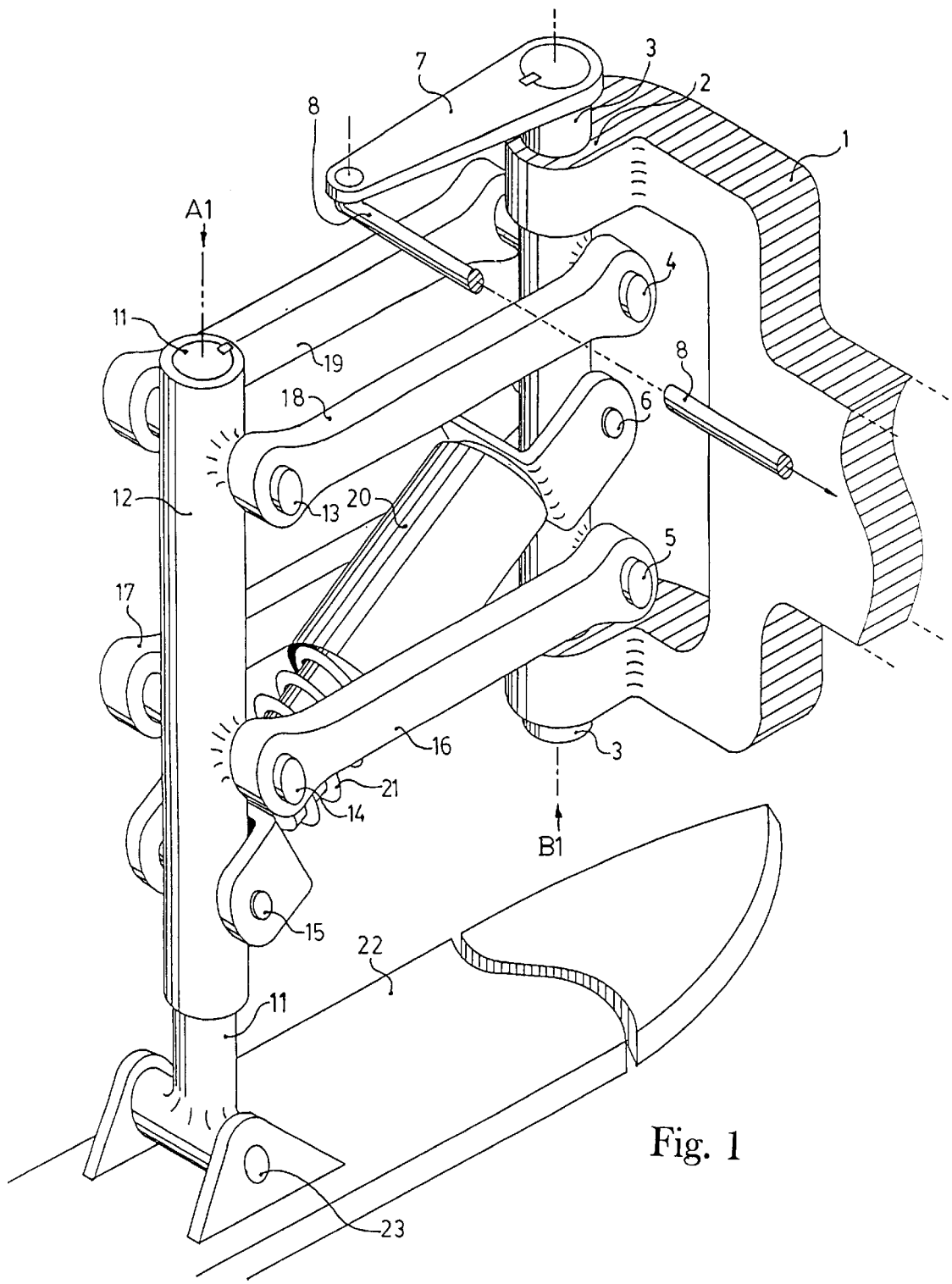
FIG. 1 is a perspective view of the preferred embodiment of the invention viewed from the center of the snowmobile showing the left side of the snowmobile front suspension and steering mechanism.

Referring now to FIG. 1, a snowmobile frame 1 is shown having a frame mounted generally vertical support bearing 2 on its left outboard extremity. A rotatable suspension mounting 3, with horizontal rotatable suspension mounting integral upper bearing 4 and rotatable suspension mounting integral lower bearing 5, pivots within the frame mounted generally vertical support bearing 2 about steering axis B1. The suspension steering control arm 7 is fixed to the rotatable suspension mounting 3 such that rotational movement of the outboard end of the suspension steering control arm 7 about the steering axis B1 rotates the rotatable suspension mounting 3 about the steering axis B1 within the frame mounted generally vertical support bearing 2. Longitudinal displacement of movable steering rod 8 by the steering arm 25 in FIG. 10 during the steering function directs the rotational movement of suspension steering control arm 7 about the steering axis B1. The steerable ski 22 is pivotally attached to a generally upright ski leg 11 by the transverse ski pivot bearing 23 permitting the ski 22 to follow uneven terrain. The ski leg 11 is fixed within the vertical ski leg bearing support 12 which has horizontal integral upper ski leg suspension bearing 13 and integral lower ski leg suspension bearing 15. The inboard upper suspension arm 18 is horizontally pivotally attached to the rotatable suspension mounting integral upper bearing 4 on its inboard end and horizontally pivotally attached to the upper ski leg suspension bearing 13 on its outboard end. The outboard upper suspension arm 19 is similarly mounted to the outboard ends of the rotatable suspension mounting integral upper bearing 4 and the outboard end of the upper ski leg suspension bearing 13 such that the upper inboard suspension arm 18 and upper outboard suspension arm 19 move in a parallel manner. The lower inboard suspension arm 16 is horizontally pivotally attached to the rotatable suspension mounting integral lower bearing 5 on its inboard end and to the lower ski leg suspension bearing 15 on the ski leg bearing support 12. Similarly, the lower outboard suspension arm 17 is connected to the rotatable suspension mounting integral lower bearing 5 on its inboard end and to the lower ski leg suspension bearing 14 on its outboard end such that the inboard lower suspension arm 16 and outboard lower suspension arm 17 move in a parallel manner. Technically a single upper suspension arm 18 and a lower suspension arm 16 will suffice for operation of the suspension. The dual upper suspension arms 18 and 19 and dual suspension arms 16 and 17 are shown for clarity of function. The upper suspension arm 18 and the lower suspension arm 16 are vertically spaced and define a parallelogram linkage for guiding the ski leg bearing support 12 to move generally vertically with respect to the rotatable suspension mounting 3. Similarly, upper suspension arm 19 and lower suspension arm 17 form a parallelogram laterally spaced to it and functioning in conjunction with it. A yieldable suspension spring and damper means 20 having integral yieldable suspension spring 21 is pivotally attached to the rotatable suspension mounting 3 via the inboard yieldable suspension spring and damper mounting 6 and pivotally attached to the ski leg support 12 via the outboard yieldable suspension spring and damper mounting 15 urging the ski leg support 12, ski leg 11 and attached ski 22 downwardly to support the weight of the front of the snowmobile. The ski leg support 12 is urged downward by the yieldable suspension spring 21 holding the steerable ski 22 in contact with the terrain to support the snowmobile and allowing vertical movement of the steerable ski 22 to navigate the unevenness of the terrain and to cushion the motion of the snowmobile on such terrain. It will be apparent to those experienced in the art that the yieldable suspension spring 21 is easily substituted by other spring means such as horizontally coiled springs acting directly on the suspension arms 16, 17, 18 and 19 via torsional rotation about the rotatable suspension mounting integral upper bearing 4 and lower bearing 5, or rubber torsion means acting in a similar fashion. In addition to the typical piston type of damping device shown as yieldable suspension spring and damper 20, this invention also anticipates the use of multi disc type viscous damping devices mounted to be in communication between the rotatable suspension mounting 3 and ski leg support 12 for the purpose of damping the vertical motion of the steerable ski 22. Typical anti sway stabilizer bars can be connected between the right and left suspensions according to known methods. Steering of the snowmobile is accomplished by turning the steering handlebar 24 (see FIG. 8) which, via connected steering column 32, connected steering arm 25 and movable steering rod 8 linkage moves the suspension steering control arm 7 and rotatable suspension mounting 3 about the steering axis B1 within the frame mounted generally vertical support bearing 2. This rotation in a horizontal plane about the steering axis B1 rotates the ski leg bearing support 12, ski leg 11 and steerable ski 22 via the suspension arm 16, 17, 18 and 19 linkage around the steering axis B1 changing the angle of the steerable ski 22 with respect to the direction of travel of the snowmobile. The steerable ski 22 supports the snowmobile on its lower running surface and is centrally pivotally attached to the ski leg bearing support 12 by a transversely mounted horizontal ski pivot bearing 23. The ski leg bearing support 12 changes its position with respect to the center line of the snowmobile and thus also changes its position to the center of gravity of the snowmobile as it rotates around the steering axis B1. The supporting area of the steerable ski 22 moves closer to the snowmobile on the inside of a turn while the supporting area of the parallel steerable ski 22 on the outside of the turn moves away from the center line of the snowmobile. This shifts the support of the snowmobile during turning to the outside of the turn acting to widen the effective support stance and increase the turning stability of the snowmobile.

Figure 2:
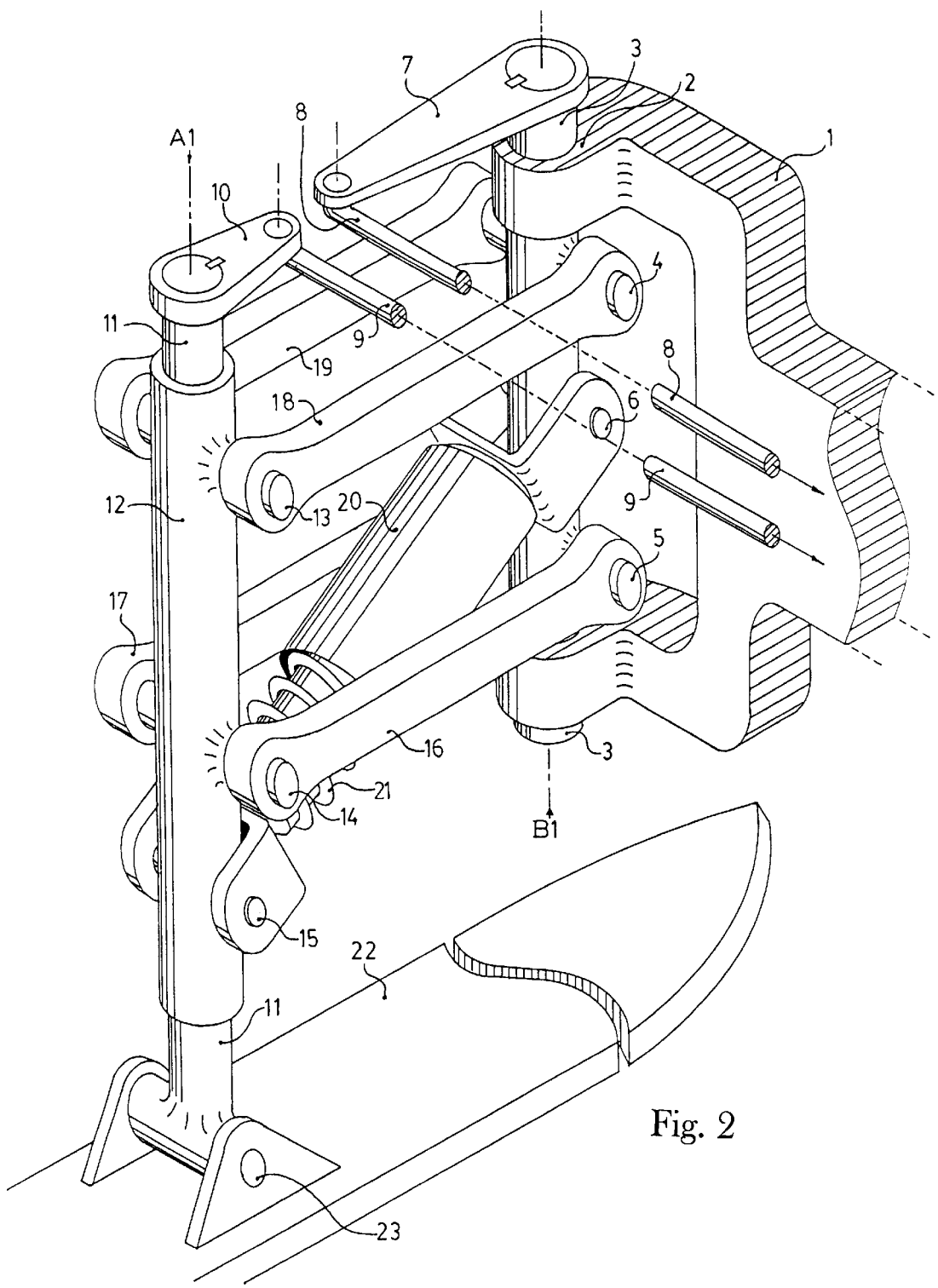
FIG. 2 is a perspective view of an embodiment of the invention viewed from the center of the snowmobile showing the left side of the snowmobile front suspension and steering mechanism employing a secondary ski steering axis

FIG. 2 shows the apparatus in FIG. 1 with the inclusion of a secondary turning axis A1 for the ski leg 11. The embodiment in FIG. 2 exhibits increased angular displacement of the steerable ski 22 during the turning function. Steering is accomplished in the same manner as previously described in FIG. 1. The ski leg 11 in this embodiment is free to rotate within the ski leg bearing support 12, such rotation being guided by an attached ski leg control arm 10. The outboard end of the ski leg control arm 10 is linked to the central snowmobile frame 29 (see FIG. 5) by a stationary control rod 9. The stationary control rod 9 holds the outboard end of the steering control arm 10 in a position that remains equidistant from the snowmobile central frame 29 in FIG. 5 during rotation of the ski leg bearing support 12 when steering. The ski leg 11 rotates within the ski leg support bearing 12 about the pivotal attachment point of the stationary control rod 9 to the outboard end of the ski leg control arm 10 increasing the angular displacement of the ski leg control arm 10, ski leg 11 and steerable ski 22 with respect to the ski leg bearing support 12 in the direction of the turn. The embodiment of this secondary steering axis A1 in FIG. 2 provides for increased angular displacement of the steerable ski 22 with the same angle of rotation of the handlebar 24. The length of the ski leg control arm 10 determines its effect on increasing ski 22 rotation, the lowest (zero) secondary angular rotation of the ski occurring when the ski leg control arm is the same length as the distance between the steering axis B1 and secondary ski axis A1.

Figure 3:
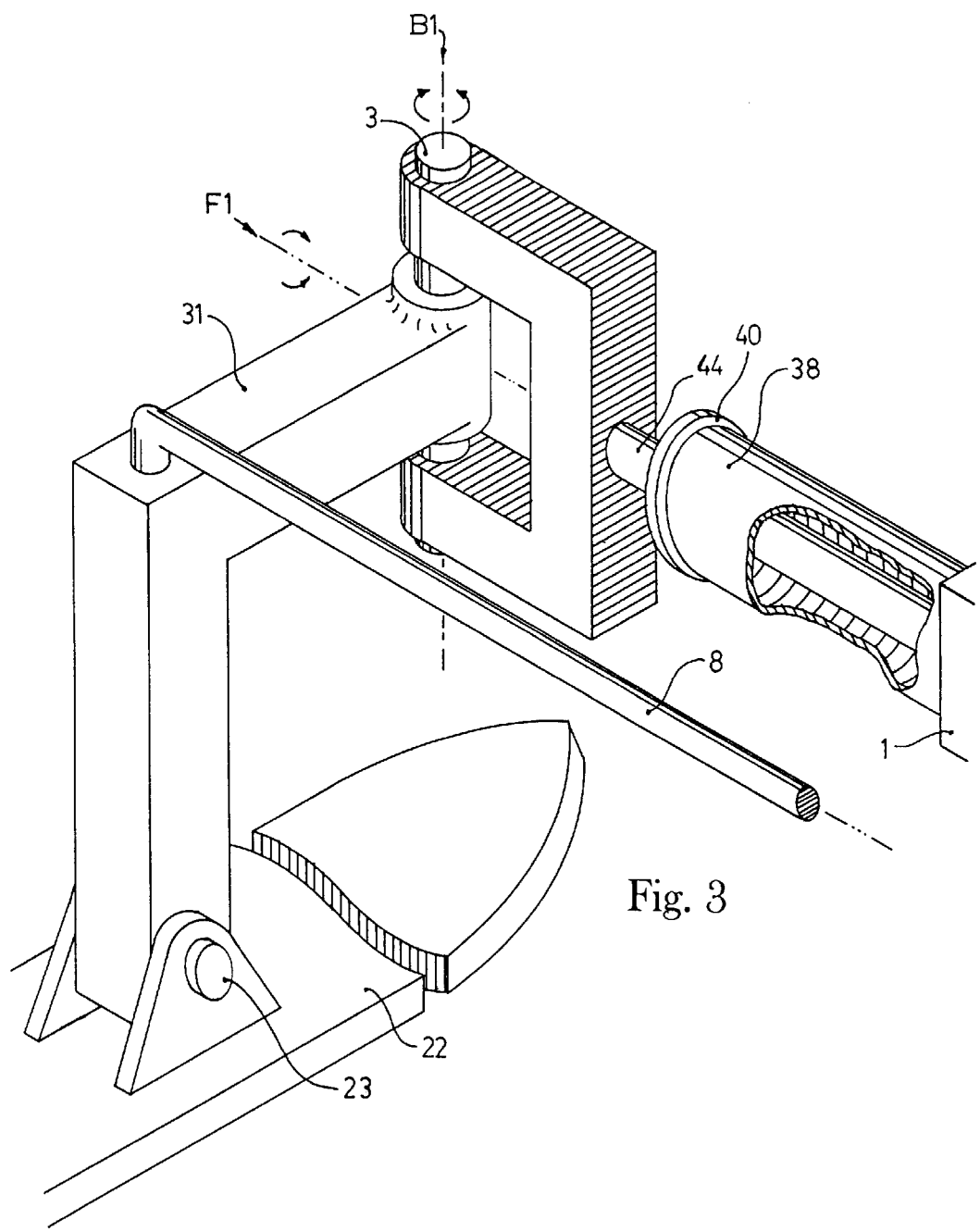
FIG. 3 is perspective view of an embodiment of the invention viewed from the center of the snowmobile showing the left side of the snowmobile front suspension and steering mechanism employing a torsion member and integral suspension arm and support bearing.

FIG. 3 shows an embodiment of the invention having the downward support force on the steerable ski 22 supplied by a torsion member 44 horizontally transverse mounted to a snowmobile frame I in the front of a snowmobile within a torsion member support 38. The torsion member 44 is fixed at its inboard end (not shown) to the snowmobile frame 1 and fixed to a suspension mounting support 39 on its outboard end and supported axially within its torsion member support 38 such that the torsion member 44 imparts torsional spring action to the suspension mounting support 39. The torsion member 44 may also be torsionally rigid but free to rotate within the torsion member support 38, having the torque supplied to the torsion member 44 by a coaxial spring or rubber compression members. A disc type suspension damper 40 is shown coaxially mounted in communication with the torsion member 44 and torsion member support 38 to dampen the rotational movement of the torsion member 44 with respect to the torsion member support 38 during vertical movement of the steerable ski 22 over uneven terrain. The torsional force of the torsion member 44 rotates the generally vertical rotatable suspension mounting 3 within the suspension mounting support 39 about the torsion axis F1. The rotatable suspension arm and ski support 31, with steerable ski 22 attached by ski pivot bearing 23, pivots about steering axis B1 on the rotatable suspension mounting 3 in a generally horizontal plane in reaction to steering input via steering control rod 8, changing the angle of the steerable ski 22 with respect to the direction of snowmobile travel. A combination of the torsion suspension embodied in FIG. 3 and the parallelogram configuration embodied in FIG. 1 and FIG. 2 will be readily apparent to those familiar in the art.

Figure 4:
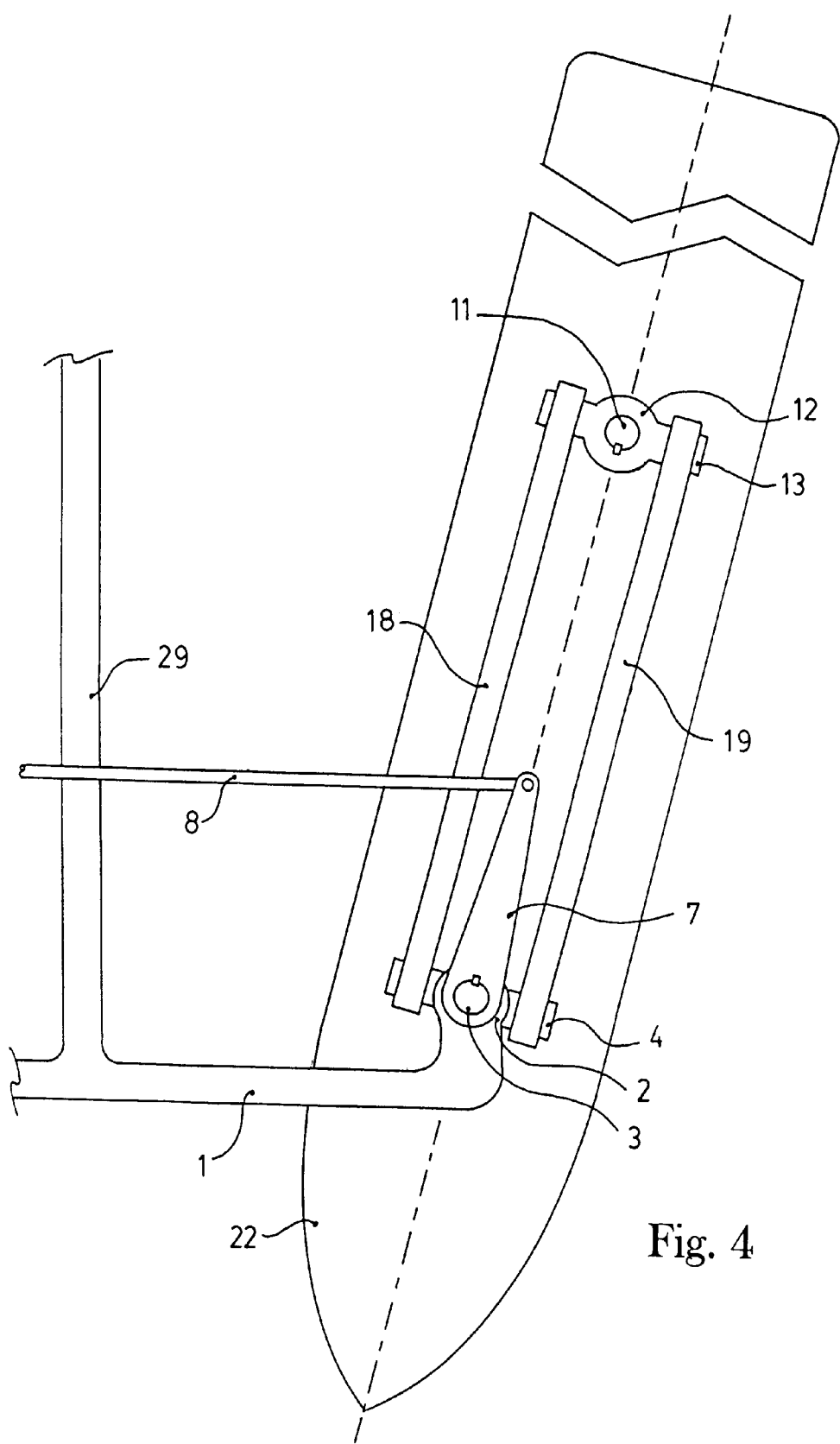
FIG. 4 is an overhead plan view of the preferred embodiment of the invention showing the left side of the snowmobile front suspension and steering mechanism with ski in a right hand turn configuration.
Figure 6:
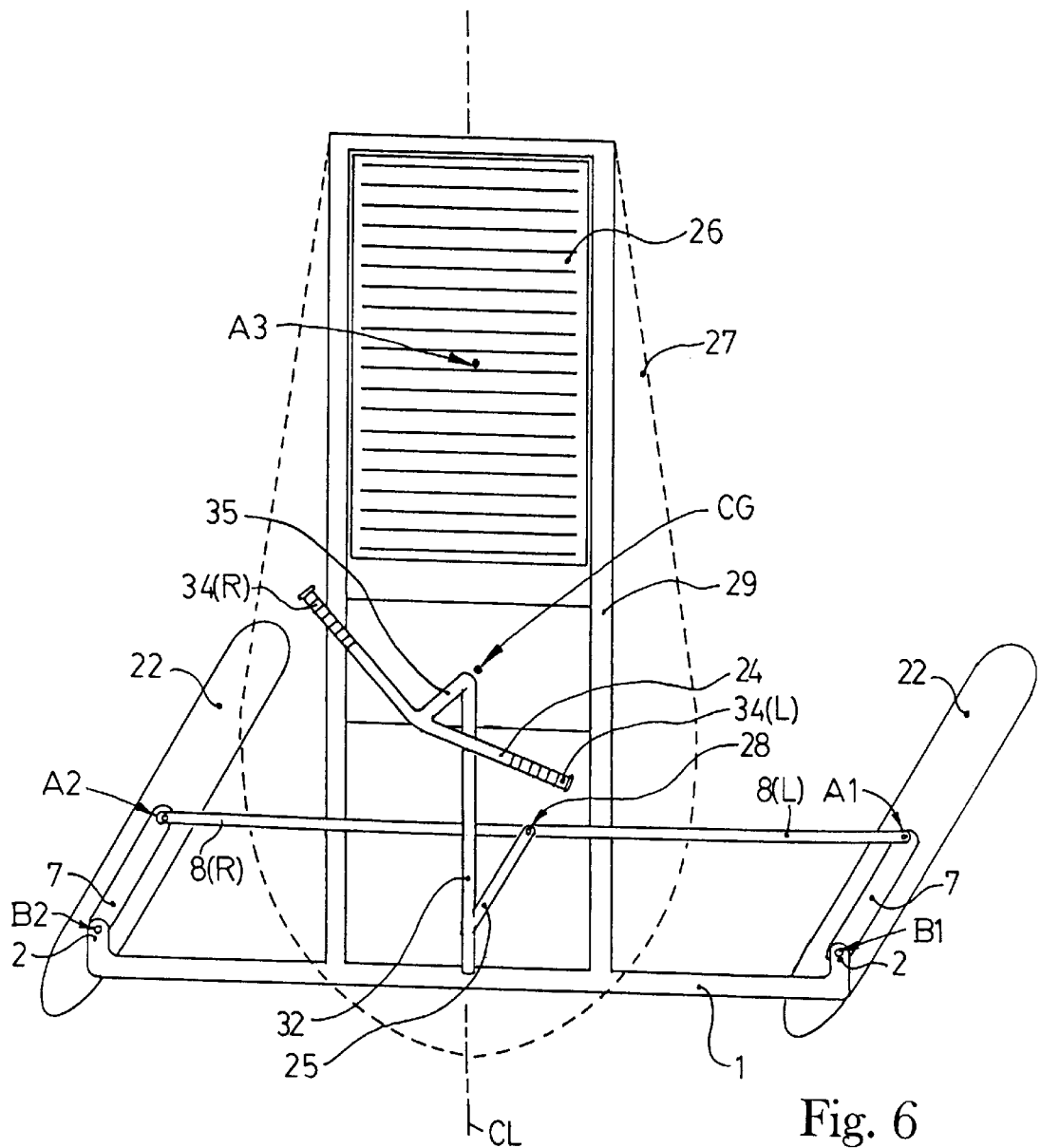
FIG. 6 is an overhead plan view of the preferred embodiment of the invention showing the entire snowmobile with the snowmobile front suspension and steering mechanism in a right hand turn configuration.

FIG. 4 is a plan view from above of the left side of the snowmobile ski suspension showing the embodiment of FIG. 1 in a right turn configuration. The steering control arm 8 is shown moved to left of the snowmobile in FIG. 4. Refer to FIG. 6 for a plan view of the snowmobile showing the steering handlebar 24 with steering arm 25 connected to steering control rod 8, positioned in a right hand turn configuration. In FIG. 4 the steering control rod 8 is shown pivotally connected to the outboard end of suspension control arm 7, having rotated the suspension control arm 7 and attached rotatable suspension mounting 3 clockwise, as viewed, within the frame mounted generally vertical support bearing 2. The inboard upper suspension arm 18, and parallel outboard suspension arm 19, pivotally connected to the rotatable suspension mounting 3 via rotatable suspension mounting upper bearing 4, are shown in the clockwise rotated position resulting from rotation of the rotatable suspension mounting 3 by suspension control arm 7 and steering input via steering control rod 8. The resultant radial movement, about the center of the frame mounted generally vertical support bearing 2, of ski leg 11 and ski leg support 12 which is pivotally attached to the inboard upper suspension arm 18 and outboard upper suspension arm 19 via upper ski leg suspension bearing 13 turns the steerable ski 22 in similar fashion to the right. The inboard lower suspension arm 16 and outboard lower suspension arm 17 and attachments shown in FIG. 1 have been omitted for clarity. The ski leg bearing support 12 would be the same distance from the central snowmobile frame 29 as the rotatable suspension mounting 3 during straight line movement of the snowmobile. FIG. 4 shows the ski leg bearing support 12 moved away from the central snowmobile frame 29 toward the outside of the turning arc thus providing increased support on the outside of the turn and stabilizing the snowmobile. The steering movement of the suspension steering control arm 7 rotates the entire suspension via the rotatable suspension mounting 3, imparting rotation to the steerable ski 22 and shifting the centre of support of the steerable ski 22 toward the outside of the turning arc. At the same time and in unison in a parallel fashion, the steerable ski 22 on the opposite side of the snowmobile is moved toward the central snowmobile frame 29, reducing the support of the snowmobile on the inside of the turning arc.

Figure 5:
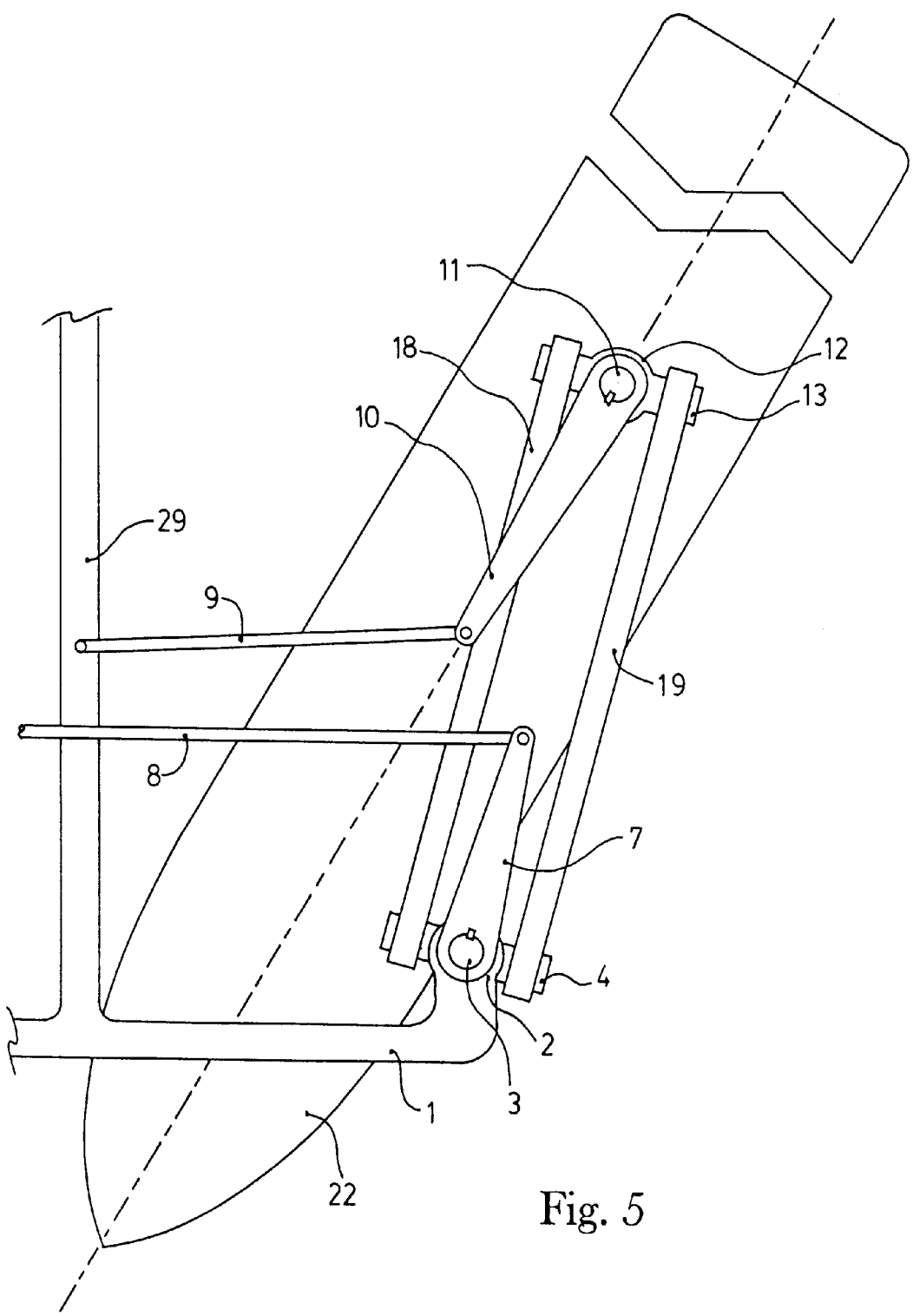
FIG. 5 is an overhead plan view of an embodiment of the invention showing the left side of the snowmobile front suspension and steering mechanism with ski and a secondary ski steering axis in a right hand turn configuration.

FIG. 5 is a plan view from above of the left side of the snowmobile suspension showing the embodiment of FIG. 2 in a right hand turn configuration. Operation of the steering handlebar 24 rotates the steering and suspension assembly as detailed in the FIG. 4 description. However, in the FIG. 5 embodiment, the ski leg 11 is rotatable within the ski leg bearing support 12. Ski leg steering control arm 10 is fixed on its inboard end to the ski leg 11 and swivel attached to the central snowmobile frame 29 on its outboard end via a stationary steering control rod 9. The stationary steering control rod 9 holds the outboard end of the ski leg steering control arm 10 at an equidistant position from the central snowmobile frame 29 causing the ski leg control arm 10 to rotate the attached ski leg 11 within the ski leg bearing support 12 as the ski leg bearing support is moved toward or away from the central snowmobile frame 29 by suspension rotation about the rotatable suspension mounting 3 during steering activation. The ski leg steering control arm 10 serves to increase the turning angle of steerable ski 22 rotation with a given steering control rod 8 movement. This is particularly useful when a long dimension is chosen for the length of the suspension arms 16, 17, 18, and 19 and insufficient angular displacement of the suspension during steering results. The length of the ski leg steering control arm 10 also can be chosen to provide the most desirable turning characteristics of the steerable ski 22.

Figure 7:
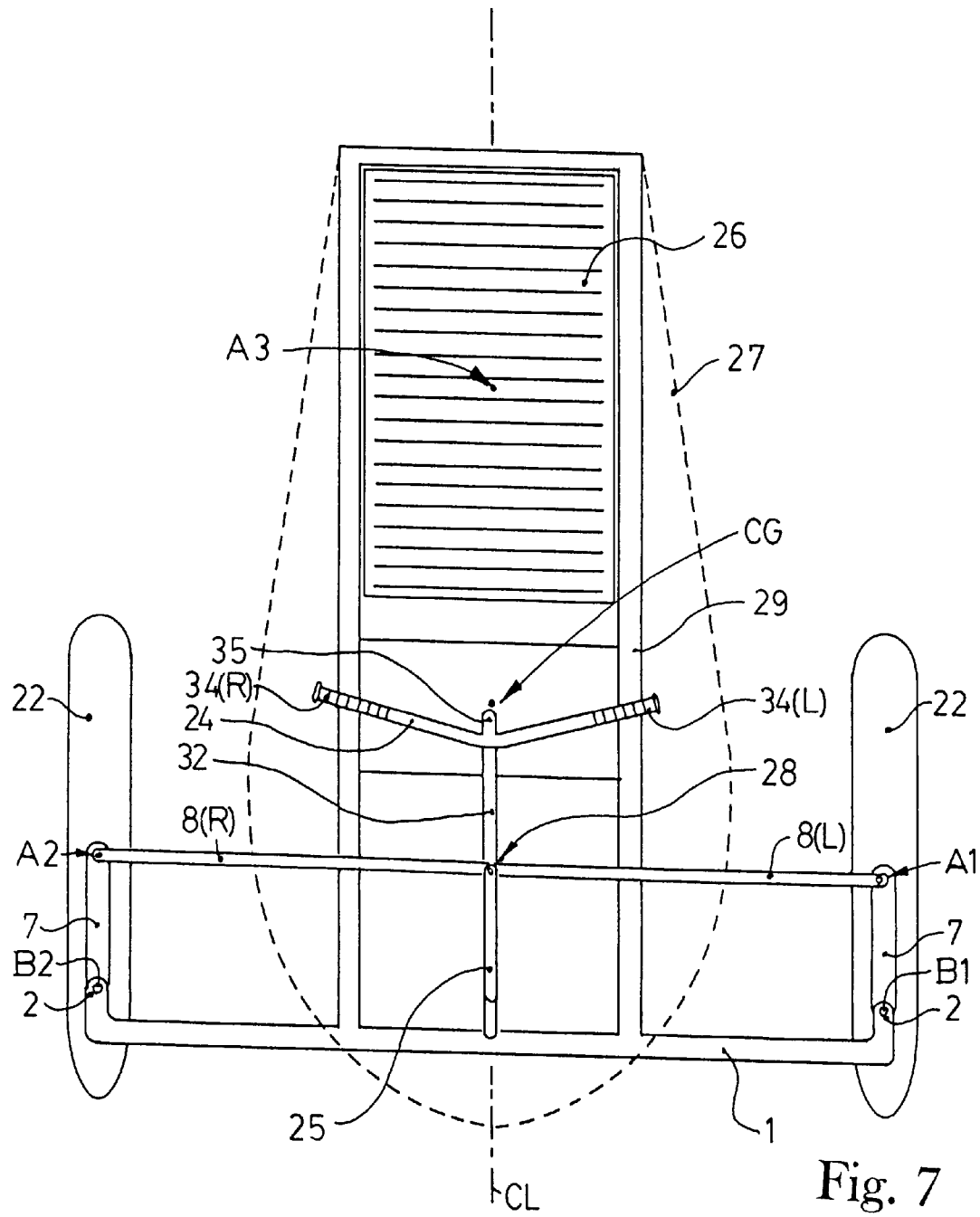
FIG. 7 is an overhead plan view of the preferred embodiment of the invention showing the entire snowmobile with the snowmobile front suspension and steering mechanism in a straight ahead configuration.

FIG. 6 is a plan view of a snowmobile with the steering and suspension embodiment of FIG. 1 shown in a right hand turn configuration. FIG. 6 shows the steering handlebar 24 with driver hand grips 34(L) and 34(R) offset forward from the steering column 32. The right hand turn configuration of FIG. 6 clearly shows that the left hand driver hand grip 34(L) is moved closer to the centerline CL of the snowmobile because of the forward offset of the steering handlebar 24 during the right hand turn, in effect moving the center point of the steering handlebar 24 towards the inside of the turning arc of the snowmobile and thus positioning the driver's weight closer to the inside of the turn to improve stability in the turn. FIG. 6 shows the steering handlebar 24 fixed to the steering arm 25 via steering column 32 in the right hand turn configuration. The left steering control rod 8(L) and right steering control rod 8(R), in communication with the steering arm 25 and left and right suspension steering control arm(s) 7, have displaced the ski center A1 and ski center A2 toward the outside of the turning arc from the straight ahead position shown in FIG. 7. The snowmobile 27 is supported by the load bearing bottom surface of the steerable ski 22 on each front side and at the rear by the endless drive track 26, this support triangle being defined by the points A1, A2, and A3. The snowmobile 27, being symmetrical to the left and right of its center line CL has a center of gravity CG somewhere along the center line CL of the snowmobile within the support triangle as described. FIG. 7 shows that the center of gravity CG is equidistant from the left ski center A1 and the right ski center A2 during straight line travel of the snowmobile 27. In the FIG. 6 right hand turn configuration the left ski center A1 is moved away from the center of gravity CG toward the outside of the turning arc and the right ski center A2 is moved closer to the center of gravity CG on the inside of the turning arc. The support triangle thus defined has a center of gravity closer to the inside of the turning arc and is more stable in the turn.

Figure 8:
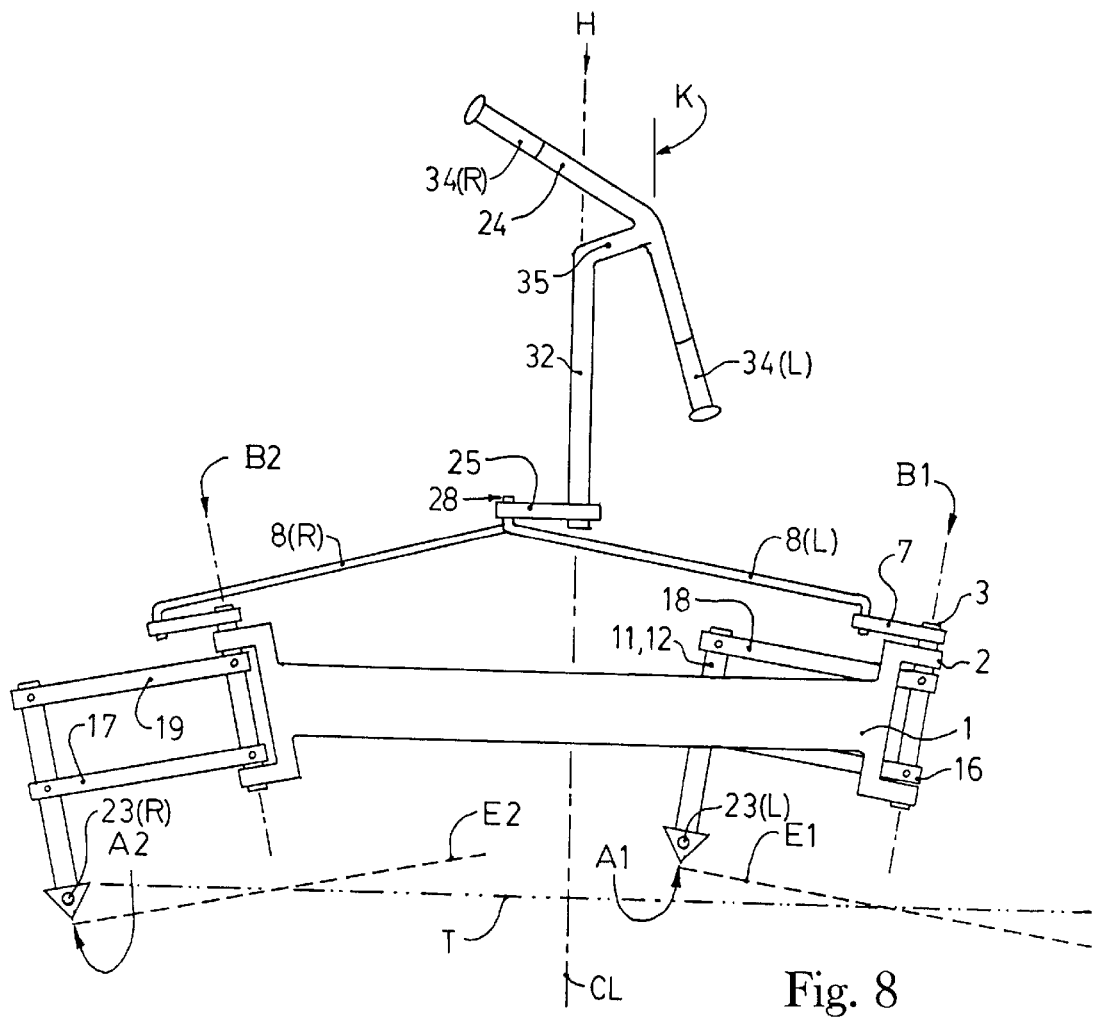
FIG. 8 is a front view of the preferred embodiment of the invention showing the steering handlebar, snowmobile front suspension and steering mechanism in a left hand turn configuration with positive camber.

FIG. 8 shows a front view of the snowmobile frame 1 with suspension and steering components in a left hand turn configuration. The steering handlebar 24 with a center line K is offset from the steering column axis of rotation H by the distance K–H. The handlebar center line K of the steering handlebar 24 approximates the driver's body position toward the inside of the turning arc during the turn. The left steering axis B1 is shown in the preferred positive camber position which guides the left ski pivot bearing 23(L) and steerable ski 22 (not shown) around the left ski steering axis B1 on left ski steering plane El. The left ski steering plane El intersects the terrain T beneath the snowmobile at a point directly below left steering axis B1 during straight ahead motion of the snowmobile. During a left hand turn as shown in FIG. 8 the position of the left hand ski pivot bearing 23(L) and steerable ski 22 (not shown) rise above the terrain T along steering plane El. The suspension arms 16, 18 allow the integral ski leg 11 and ski leg bearing support 12 with left ski pivot bearing 23(L) and steerable ski 22 (not shown) to remain in contact with the terrain T but the downward movement of the assembly to maintain terrain T contact extends the yieldable suspension spring 21 (not shown), reducing its force on the inside of the turning arc. The right steering axis B2 is shown in FIG. 8 in the preferred positive camber position which guides the right ski pivot bearing 23 (R) and steerable ski 22 (not shown) around the right ski steering axis B2 on right ski steering plane E2. The right ski steering plane E2 intersects the terrain T beneath the snowmobile at a point directly below right ski steering axis B2 during straight ahead motion of the snowmobile. During a left hand turn as shown in FIG. 8 the position of the right ski pivot bearing 23 (R) and steerable ski 22 (not shown) falls below the terrain T. The suspension arms 17, 19 are forced upwards to maintain the steerable ski 22 position on the terrain T and the yieldable suspension spring 21 (not shown) is further compressed, providing increased support pressure on the right steerable ski 22 (not shown) on the outside of the turning arc and stabilizing the snowmobile in the turn. The steering geometry of the preferred embodiment in FIG. 8 emulates a downhill skier making a similar turn, positioning his body weight into the inside of the turn with skis extended to the outside of the turn and the greatest ski pressure on the outside ski to maintain balance.

Figure 9:
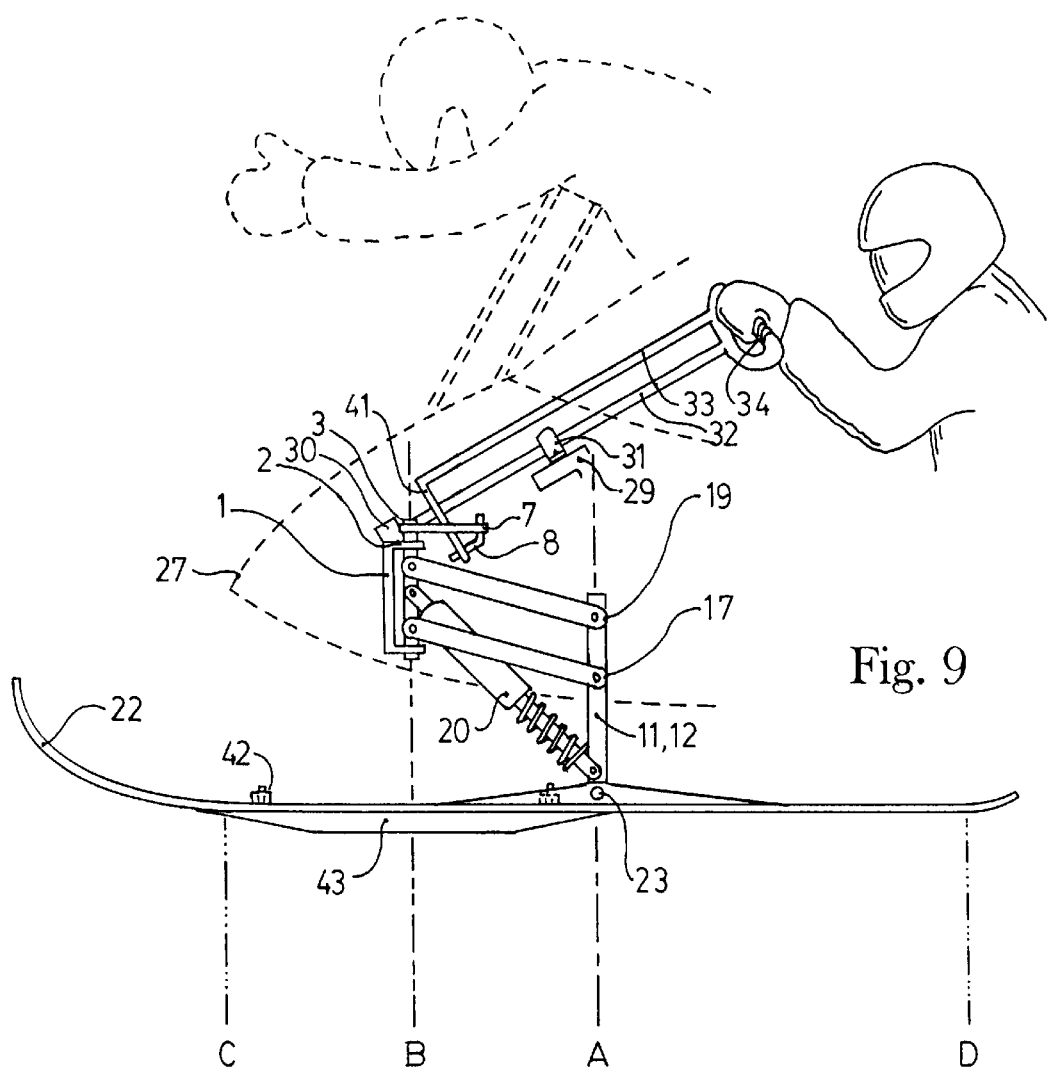
FIG. 9 is a side view of the preferred embodiment of the invention showing the snowmobile front suspension and steering mechanism with ski.

FIG. 9 is a left side view of the preferred embodiment of FIG. 1 showing the steerable ski 22 in a straight ahead position. The steerable ski 22 has a turned up front end and a trailing end with a terrain supporting bottom surface between C and D. The steerable ski 22 supports the snowmobile frame 1 via yieldable suspension spring and damper 20 guided by centrally located transverse ski pivot bearing 23, integral ski leg 11, ski leg bearing support 12, suspension arms 17, 19 (suspension arms 17, 18 not shown), rotatable suspension mounting 3 and frame mounted generally vertical support bearing 2. Typical snowmobile skis have a keel section on the bottom running surface generally extending for the full length of the ski to provide steering grip on the snow. This keel section is more or less equal forward of the center of the ski and rearward of the center of the ski. This is necessary to present equal resistance on each side of the turning axis of the ski as it is angled to the direction of travel for the purpose of turning. A typical ski as just described will function on the preferred embodiment of this invention but will be difficult to steer due to the lateral movement of the ski during turning. Excess keel rearward of the turning axis of the ski will result in greater resistance to turning due to the greater pressure rearward of the turning axis of the ski trying to straighten the ski. FIG. 9 shows a steerable ski 22 having a bottom running surface extending from point C to point D with a generally central support point A and a steering axis B about which the ski rotates during steering input. The movable ski keel 43 on the bottom running surface of steerable ski 22 tapers to the front and rear of its height and is centered below the rotatable suspension mounting 3 on steering axis B such that the ski keel 43 has generally the same steering effect in front of the steering axis B and behind the steering axis B thus reducing steering effort. The rear portion of the steerable ski 22 does not have any keel and serves only to support the snowmobile. The degree of steering effort can be adjusted by simply moving the movable ski keel 43 forward on the center line of the steerable ski 22 for reduced turning effort or rearward for increased turning effort. Movable ski keel 43 is movably fixed to the bottom of steerable ski 22 by ski keel fasteners 42 through holes situated along the steerable ski 22 providing multiple locations for fixing the movable ski keel 43.

Figure 10:
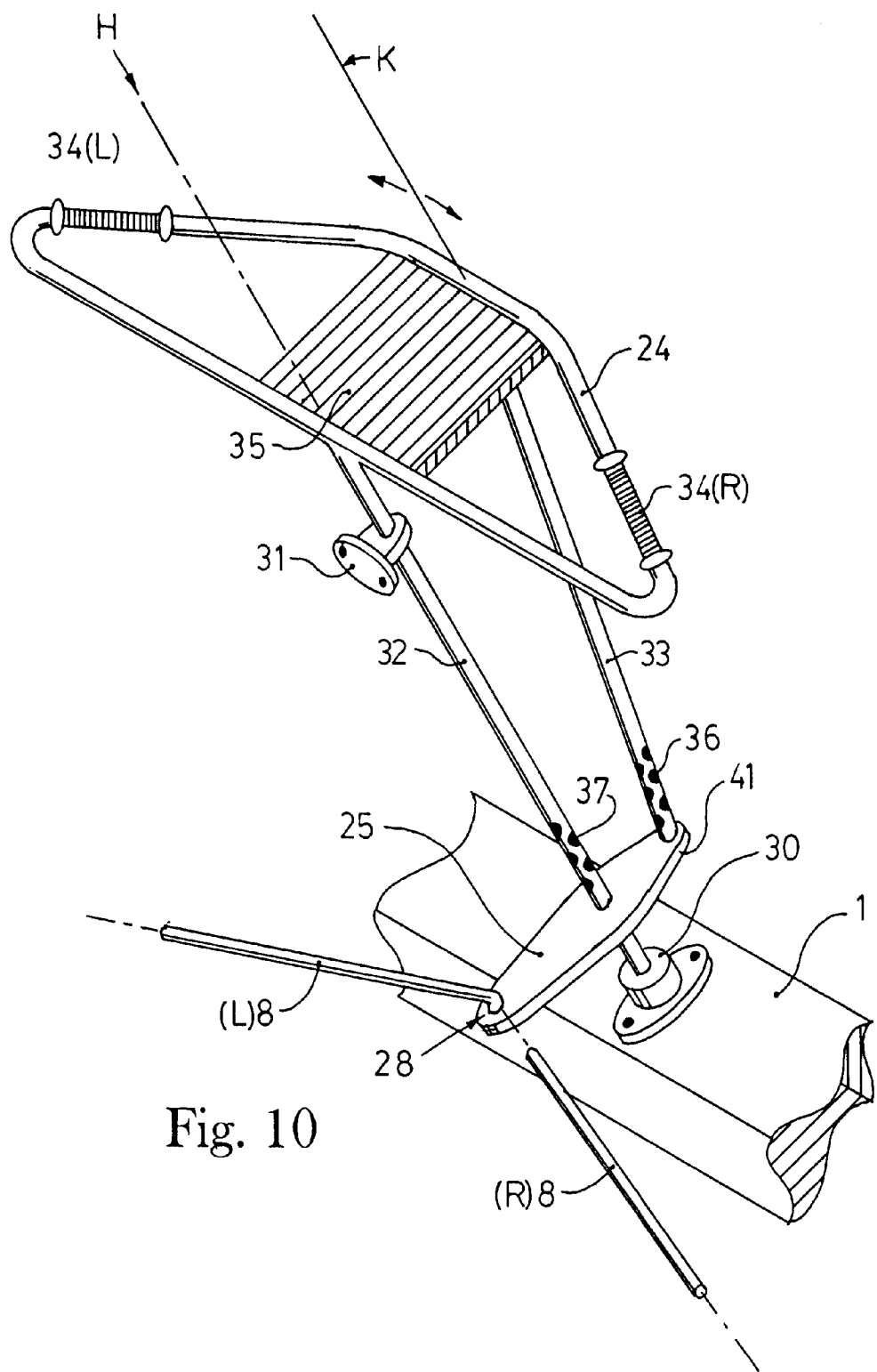
FIG. 10 is a perspective view of the preferred embodiment of the invention showing the steering column and impact support column of the snowmobile.

FIG. 10 shows the preferred embodiment of the impact absorbing breakaway steering steering column assembly. The steering column 32 and impact support column 33 are mounted in mid section to a frame of the snowmobile (not shown) via an impact releasable support bearing 31 and to the front snowmobile frame 1 by frame mounted bearing 30. The steering handlebar 24, fixed to the impact support column 33 and steering column 32, via handlebar impact support 35, forms an impact platform to intercept the driver's body during a frontal collision of the snowmobile. Steering column 32 has an energy absorbing unit 37 which may be a collapsible structure as shown or a hydraulic damping unit. A similar energy absorbing unit 36 integral with impact support column 33 works in a parallel fashion with the steering column energy absorbing unit 37 integral with steering column 32. Steering column 32 and impact support column 33 are fixed at the base of steering column 32 via impact support brace 41. The frame mounted bearing 30 supports the steering column 32 allowing rotational movement of the steering column 32 and fixes the steering assembly to snowmobile frame 1. During frontal impact of the snowmobile the driver impacts the handlebar impact support 35 and steering handlebar 24 transferring the energy of the drivers impact along steering column 32 to energy absorbing unit 37 and along impact support column 33 to energy absorbing unit 36. The energy of the snowmobile impact is directed from snowmobile frame 1 through frame mounted bearing 30 to impact support brace 41 and then to energy absorbing units 36 and 37. The offset K of the steering handlebar 24 from the steering column turning axis H requires the dual support of steering column 32 and impact column 33 to prevent tilting of the handlebar impact support 35 during an impact. The steering column 32 and impact support column 33 first absorb the energy of an impact in the energy absorbing units 36 and 37. As the impact proceeds the energy of the driver's momentum is carried by the handlebar impact support 35 causing the steering column 32 to break away from impact releasable support bearing 31 on the snowmobile frame 29. The steering column 32 and impact support column 33 then begin to move in a parallelogram fashion upward and away from the snowmobile in an arc having a general center at frame mounted bearing 30. The forward momentum of the driver is thus translated into vertical motion reducing the severity of the impact and moving the driver upward away from the object of the collision, reducing injury.

The steering handlebar 24 central mounting axis K is shown in FIG. 10 offset forward from the steering column turning axis H such that the central mounting axis K rotates about the steering column turning axis as the steering handlebar 24 is turned to the left or right. The offset distance H–K causes the steering handlebar 24 to become offset from the center line of the snowmobile 27 toward the inside of the turn being executed thus guiding the drivers body weight also towards the inside of the turn and improving cornering stability.

The FIG. 9 embodiment of the steering column assembly of FIG. 10 shows the preferred downward sloping configuration of the steering assembly and attachment to the snowmobile frame I at the frame mounted bearing 30 in the position most suited to absorb the impact of a frontal collision. The steering column assembly with the driver in an impact position is shown in broken lines in the expected ejected position after a frontal impact of the snowmobile. The steering column 32 with impact column 33 have broken away from impact releasable support bearing 31 on the frame of the snowmobile and are shown in broken lines having pivoted upward and away from the snowmobile in a parallelogram fashion.

DESCRIPTION OF THE NUMERALS

1) Snowmobile frame
2) Frame mounted generally vertical support bearing
3) Rotatable suspension mounting
4) Rotatable suspension mounting integral upper bearing
5) Rotatable suspension mounting integral lower bearing
6) Inboard yieldable spring and damper mounting
7) Suspension steering control arm
8) Moveable steering control rod (L) & (R)
9) Stationary steering control rod
10) Ski leg control arm
11) Ski leg
12) Ski leg bearing support
13) Upper ski leg suspension bearing
14) Lower ski leg suspension bearing 15) Outboard yieldable suspension spring mounting
16) Inboard lower suspension arm
17) Outboard lower suspension arm
18) Inboard upper suspension arm
19) Outboard upper suspension arm
20) Yieldable suspension spring and damper
21) Yieldable suspension spring
22) Steerable ski
23) Ski pivot bearing (L) & (R)
24) Steering handlebar
25) Steering arm
26) Endless drive track
27) Snowmobile body
28) Steering control rod linkage attachment
29) Central snowmobile frame
30) Frame mounted bearing
31) Impact releasable support bearing
32) Steering column
33) Impact support column
34) Driver hand grip
35) Handlebar impact support
36) Impact support column energy absorbing unit
37) Steering column energy absorbing unit
38) Torsion member support
39) Suspension mounting support
40) Disc type suspension damper
41) Impact support brace
42) Ski keel fastener
43) Movable ski keel
44) Torsion member
A) Center of ski
B) Steering axis of ski
C) Leading end of ski ground contact
D) Trailing end of ski ground contact
A1) Left secondary ski steering axis
A2) Right secondary ski steering axis
A3) Rear support center of snowmobile
B1) Left ski steering axis
B2) Right ski steering axis
CG) Center of gravity
CL) Center line of snowmobile
E1) Left ski steering plane
E2) Right ski steering plane
F1) Torsion axis
H) Steering column turning axis
K) handlebar center line
T) Terrain (ground surface)

I claim:

1. A snowmobile ski suspension and steering mechanism comprising a left and a right steerable ski adapted for a snowmobile, each ski being pivotally attached on a horizontal axis transverse to its length to the lower end of a generally upright ski leg, said ski leg being rigidly mounted about its longitudinal axis in a respective bearing support, and suspension linkage means connecting said bearing support and comprising:

a bearing, generally vertical in axis, supporting a rotatable suspension mounting adapted to a snowmobile and, a suspension steering control arm having an inboard end and an outboard end, said inboard end being rigidly attached to said rotatable suspension mounting and said outboard end having attached to it an articulating moveable steering control rod, said articulating moveable steering control rod being either a left moveable steering control rod or a right moveable steering control rod, such that moving said moveable steering control rod linearly on its longitudinal axis rotates said suspension control arm and said rotatable suspension mounting on its axis about said generally vertical support bearing adapted to a snowmobile; and an upper and a lower parallel suspension arm, vertically spaced, each having an outboard end articulated to said ski leg bearing support and an inboard end articulated to said rotatable suspension mounting adapted to a snowmobile and defining a parallelogram linkage for guiding said ski leg bearing support to move generally vertically with respect to the terrain; and yieldable suspension spring and damper means operatively associated with each ski to urge it downwardly to support said rotatable suspension mounting, adapted to a snowmobile, thereon and dampen vertical movement thereof, said suspension spring and damper means having one end attached to said rotatable suspension mounting adapted to a snowmobile and the opposite end connected to said bearing support of said generally upright ski leg; and a steering assembly for rotating said rotatable suspension mounting adapted to a snowmobile, said steering assembly comprising; said left moveable steering control rod and said right moveable steering control rod connected on each respective outboard end to said left and right rotatable suspension steering control arms and each respective inboard end connected to a steering control arm, said steering control arm having pivotal connections to said left and right moveable steering control rods on its outboard end and being fixed to a rotatable steering column on its inboard end such that rotation of said steering column about its longitudinal axis causes said steering control arm to rotate about said longitudinal axis thereby moving both left and right moveable steering control rods generally horizontally either to the left or right and pivoting said rotatable suspension mountings, said suspension arms, said ski leg bearing supports, said ski legs and said skis.

2. A snowmobile ski suspension and steering mechanism comprising a left and a right steerable ski adapted for a snowmobile, each ski being pivotally attached on a horizontal axis transverse to its length to the lower end of a generally upright ski leg, said ski leg being mounted to be rotatable about its longitudinal axis in a respective bearing support, and suspension linkage means connecting said bearing support and comprising:

a bearing, generally vertical in axis, supporting a rotatable suspension mounting adapted to a snowmobile and, a suspension steering control arm having an inboard end and an outboard end, said inboard end being rigidly attached to said rotatable suspension mounting and said outboard end having attached to it an articulating moveable steering control rod, said articulating moveable steering control rod being either a left moveable steering control rod or a right moveable steering control rod, such that moving said moveable steering control rod linearly on its longitudinal axis rotates said suspension control arm and said rotatable suspension mounting on its axis about said generally vertical support bearing adapted to a snowmobile; and an upper and a lower parallel suspension arm, vertically spaced, each having an outboard end articulated to said ski leg bearing support and an inboard end articulated to said rotatable suspension mounting adapted to a snowmobile and defining a parallelogram linkage for guiding said ski leg bearing support to move generally vertically with respect to the terrain; and yieldable suspension spring and damper means operatively associated with each ski to urge it downwardly to support said rotatable suspension mounting, adapted to a snowmobile, thereon and dampen vertical movement thereof, said suspension spring and damper means having one end attached to said rotatable suspension mounting adapted to a snowmobile and the opposite end connected to said bearing support of said generally upright ski leg; and a steering assembly for rotating said rotatable suspension mounting adapted to a snowmobile, said steering assembly comprising; a left moveable steering control rod and a right moveable steering control rod connected on each respective outboard end to said left and right rotatable suspension steering control arms and each respective inboard end connected to a steering control arm, said steering control arm having pivotal connections to said left and right moveable steering control rods on its outboard end and being fixed to a rotatable steering column on its inboard end such that rotation of said steering column about its longitudinal axis causes said steering control arm to rotate about said longitudinal axis thereby moving both left and right moveable steering control rods generally horizontally either to the left or right and pivoting said rotatable suspension mountings, said suspension arms, said ski leg bearing supports, said ski legs and said skis; and a ski leg control arm having an inboard end and an outboard end, said inboard end fixed to the rotatable ski leg and said outboard end fixed by a stationary control rod adapted to a snowmobile, said stationary control rod being swivel connected on its outboard end to the outboard end of said ski leg control arm and swivel connected on its inboard end adapted to a snowmobile such that the outboard end of said ski leg control arm will remain relatively horizontally equidistant from the inboard end of said stationary control rod during rotation of said ski leg bearing supports about said rotatable suspension mountings during steering, resulting in a pivoting of said ski leg and said ski about said ski leg longitudinal axis relative to said ski leg bearing support.

3. A snowmobile ski suspension and steering mechanism as in claim 1 having the steerable ski adapted to support the front end of a snowmobile, said steerable ski being centrally pivotally attached on a horizontal axis transverse to its length to said generally upright ski leg and comprising;

an elongated member having a turned up front end and an aft end, wherein said member has a bottom running surface extending from said turned up front end to said aft end:

a keel fixed to said member and protruding from said bottom running surface of said steerable ski, said keel being forwardly located between said central horizontal transverse pivotal axis and said turned up front end and being approximately the same length as said running surface forward of said central horizontal pivotal axis and said turned up front end and having a generally curved shape along its lower edge with its maximum protrusion proximate to that portion of said ski which is structured to be below the steering axis of said ski, said keel protrusion diminishing in both fore and aft directions from said keel maximum protrusion to be substantially zero protrusion at its fore and aft ends.

4. A snowmobile ski suspension and steering mechanism as in claim 3 having said steerable ski adapted to support the front end of a snowmobile wherein said keel is a separate unit fixed to said steerable ski by suitable fasteners, said steerable ski having provisions on said bottom running surface for changeably locating said separate keel in one of a number of suitable locations forward of said horizontal transverse pivotal axis along said bottom running surface of said steerable ski.

* * * * *